United States Patent
Gaskins et al.

(10) Patent No.: US 8,762,779 B2
(45) Date of Patent: Jun. 24, 2014

(54) MULTI-CORE PROCESSOR WITH EXTERNAL INSTRUCTION EXECUTION RATE HEARTBEAT

(75) Inventors: Darius D. Gaskins, Austin, TX (US); Jason Chen, Austin, TX (US); Rodney E. Hooker, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 865 days.

(21) Appl. No.: 12/964,949

(22) Filed: Dec. 10, 2010

(65) Prior Publication Data

US 2011/0185160 A1    Jul. 28, 2011

Related U.S. Application Data

(60) Provisional application No. 61/297,505, filed on Jan. 22, 2010, provisional application No. 61/314,253, filed on Mar. 16, 2010.

(51) Int. Cl.
*G06F 11/00* (2006.01)
*G06F 11/36* (2006.01)

(52) U.S. Cl.
CPC .......... *G06F 11/364* (2013.01); *G06F 11/3656* (2013.01); *G06F 11/3652* (2013.01)
USPC ......................................................... 714/30

(58) Field of Classification Search
USPC ......................................................... 714/30
See application file for complete search history.

(56) References Cited

U.S. PATENT DOCUMENTS

| | | | |
|---|---|---|---|
| 4,881,228 A * | 11/1989 | Shouda | 714/38.12 |
| 5,630,049 A | 5/1997 | Cardoza et al. | |
| 5,850,562 A | 12/1998 | Crump et al. | |
| 5,963,725 A * | 10/1999 | Inoue | 703/17 |
| 6,094,729 A * | 7/2000 | Mann | 714/25 |
| 6,438,709 B2 | 8/2002 | Poisner | |
| 6,457,073 B2 | 9/2002 | Barry et al. | |
| 6,463,529 B1 | 10/2002 | Miller et al. | |
| 6,643,796 B1 | 11/2003 | Floyd et al. | |
| 6,687,865 B1 | 2/2004 | Dervisoglu et al. | |
| 6,728,904 B2 | 4/2004 | Kanekawa et al. | |
| 7,013,398 B2 | 3/2006 | Zhao | |
| 7,058,557 B2 * | 6/2006 | Lin | 703/14 |
| 7,111,160 B1 | 9/2006 | Henniger et al. | |

(Continued)

FOREIGN PATENT DOCUMENTS

| | | |
|---|---|---|
| CN | 101000596 | 7/2007 |
| JP | 62256298 | 11/1987 |

*Primary Examiner* — Bryce Bonzo
(74) *Attorney, Agent, or Firm* — E. Alan Davis; James W. Huffman

(57) ABSTRACT

A method for debugging a multi-core microprocessor includes causing the microprocessor to perform an actual execution of instructions and obtaining from the microprocessor heartbeat information that specifies an actual execution sequence of the instructions by the plurality of cores relative to one another, commanding a corresponding plurality of instances of a software functional model of the cores to execute the instructions according to the actual execution sequence specified by the heartbeat information to generate simulated results of the execution of the instructions, and comparing the simulated results with actual results of the execution of the instructions to determine whether they match. Each core outputs an instruction execution indicator indicating the number of instructions executed by the core each core clock. A heartbeat generator generates a heartbeat indicator for each core on an external bus that indicates the number of instructions executed by each core during each external bus clock cycle.

26 Claims, 10 Drawing Sheets

(56) References Cited

U.S. PATENT DOCUMENTS

| | | | |
|---|---|---|---|
| 7,373,550 B2 * | 5/2008 | Brawn et al. | 714/28 |
| 7,590,891 B2 | 9/2009 | Ishihara | |
| 7,770,034 B2 * | 8/2010 | Nanja | 713/300 |
| 7,870,439 B2 * | 1/2011 | Fujiyama et al. | 714/47.1 |
| 8,375,219 B2 | 2/2013 | Westerinen et al. | |
| 2001/0042198 A1 | 11/2001 | Poisner | |
| 2002/0062480 A1 | 5/2002 | Kirisawa | |
| 2002/0073400 A1 | 6/2002 | Beuten et al. | |
| 2002/0129309 A1 | 9/2002 | Floyd et al. | |
| 2003/0014264 A1 | 1/2003 | Fujii et al. | |
| 2003/0056154 A1 | 3/2003 | Edwards et al. | |
| 2003/0088855 A1 * | 5/2003 | Kuzemchak et al. | 717/134 |
| 2004/0078413 A1 * | 4/2004 | Yoshimoto et al. | 708/525 |
| 2004/0221196 A1 | 11/2004 | Datta et al. | |
| 2005/0229160 A1 | 10/2005 | Rothman et al. | |
| 2005/0240933 A1 * | 10/2005 | Barsness et al. | 718/105 |
| 2007/0180315 A1 | 8/2007 | Aizawa | |
| 2007/0209072 A1 | 9/2007 | Chen | |
| 2007/0214341 A1 | 9/2007 | Das | |
| 2007/0265822 A1 * | 11/2007 | Mathewson et al. | 703/22 |
| 2008/0016405 A1 | 1/2008 | Kitahara | |
| 2008/0126877 A1 | 5/2008 | Alsup | |
| 2008/0141073 A1 | 6/2008 | Shih et al. | |
| 2008/0177527 A1 * | 7/2008 | Yoshinaga | 703/26 |
| 2008/0184055 A1 | 7/2008 | Moyer et al. | |
| 2008/0288942 A1 * | 11/2008 | Barsness et al. | 718/1 |
| 2009/0313507 A1 | 12/2009 | Swaine et al. | |
| 2009/0313623 A1 | 12/2009 | Coskun et al. | |
| 2010/0008464 A1 * | 1/2010 | Hellwig | 377/15 |
| 2010/0064173 A1 | 3/2010 | Pedersen et al. | |
| 2011/0010530 A1 | 1/2011 | Henry et al. | |
| 2011/0010531 A1 | 1/2011 | Henry et al. | |
| 2011/0029823 A1 * | 2/2011 | Horley et al. | 714/45 |
| 2011/0053649 A1 | 3/2011 | Wilson | |
| 2011/0143809 A1 | 6/2011 | Salomone et al. | |
| 2011/0185153 A1 | 7/2011 | Henry et al. | |
| 2011/0202796 A1 | 8/2011 | Henry et al. | |
| 2012/0185681 A1 | 7/2012 | Henry et al. | |

* cited by examiner

* CORE CLOCK AND HEARTBEAT SIGNAL CLOCK RATES ARE EQUAL
* EACH CORE CAPABLE OF RETIRING A SINGLE INSTRUCTION PER CORE CLOCK

| CLOCK | HEARTBEAT INFORMATION | | | RATE CONTROLLER COMMANDS | |
|---|---|---|---|---|---|
|  | CORE A | CORE B |  | CORE A | CORE B |
| 0 | 0 | 1 |  | --- | EXECUTE |
| 1 | 1 | 1 | → | EXECUTE | EXECUTE |
| 2 | 0 | 1 |  | --- | EXECUTE |
| 3 | 1 | 0 |  | EXECUTE | --- |
| 4 | 1 | 1 |  | EXECUTE | EXECUTE |
| 5 | 1 | 0 |  | EXECUTE | --- |

* CORE CLOCK AND HEARTBEAT SIGNAL CLOCK RATES ARE EQUAL
* EACH CORE CAPABLE OF RETIRING THREE INSTRUCTIONS PER CORE CLOCK

| HEARTBEAT INFORMATION | | | RATE CONTROLLER COMMANDS | |
|---|---|---|---|---|
| CLOCK | CORE A | CORE B | CORE A | CORE B |
| 0 | 0 | 1 | --- | EXECUTE 1 |
| 1 | 3 | 2 | EXECUTE 3 | EXECUTE 2 |
| 2 | 0 | 2 | --- | EXECUTE 2 |
| 3 | 2 | 0 | EXECUTE 2 | --- |
| 4 | 1 | 1 | EXECUTE 1 | EXECUTE 1 |
| 5 | 3 | 0 | EXECUTE 3 | --- |

*Fig. 10*

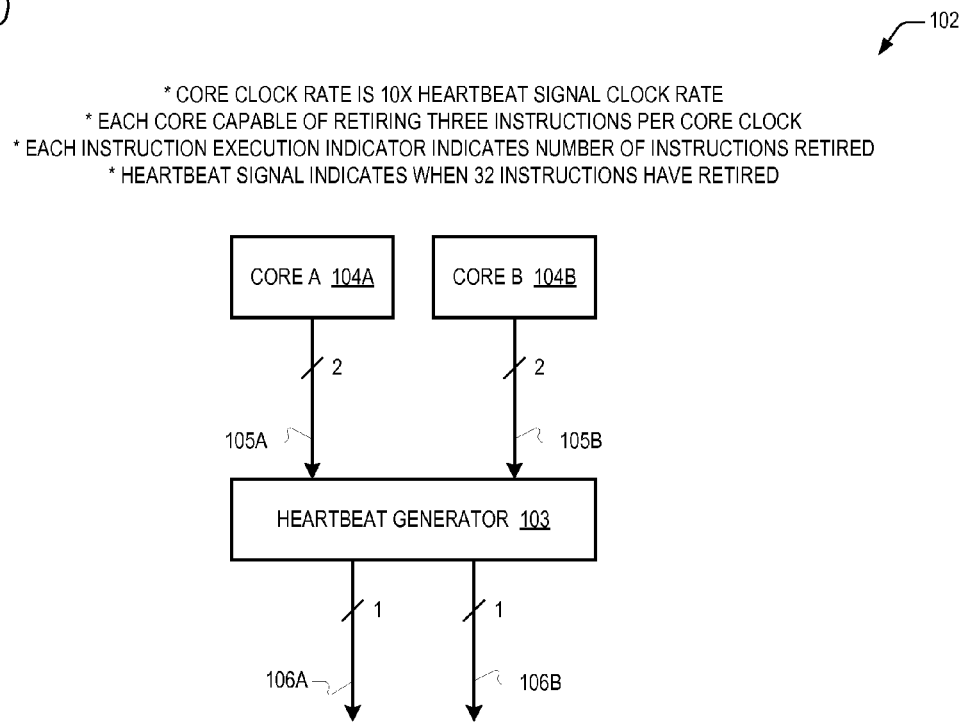

* CORE CLOCK RATE IS 10X HEARTBEAT SIGNAL CLOCK RATE
* EACH CORE CAPABLE OF RETIRING THREE INSTRUCTIONS PER CORE CLOCK
* EACH INSTRUCTION EXECUTION INDICATOR INDICATES NUMBER OF INSTRUCTIONS RETIRED
* HEARTBEAT SIGNAL INDICATES WHEN 32 INSTRUCTIONS HAVE RETIRED

*Fig. 11*

| HEARTBEAT INFORMATION ||| RATE CONTROLLER COMMANDS ||
| HEARTBEAT CLOCK | CORE A | CORE B | CORE A | CORE B |
| --- | --- | --- | --- | --- |
| 0 | 0 | 1 | --- | EXECUTE 32 |
| 1 | 1 | 0 | EXECUTE 32 | --- |
| 2 | 0 | 1 | --- | EXECUTE 32 |
| 3 | 0 | 0 | --- | --- |
| 4 | 0 | 1 | --- | EXECUTE 32 |
| 5 | 1 | 0 | EXECUTE 32 | --- |

| HEARTBEAT INFORMATION | | | RATE CONTROLLER COMMANDS | |
| --- | --- | --- | --- | --- |
| HEARTBEAT CLOCK | CORE A | CORE B | CORE A | CORE B |
| 0 | 0 | 1 | --- | EXECUTE 8 |
| 1 | 3 | 2 | EXECUTE 32 | EXECUTE 16 |
| 2 | 0 | 2 | --- | EXECUTE 16 |
| 3 | 2 | 0 | EXECUTE 16 | --- |
| 4 | 1 | 1 | EXECUTE 8 | EXECUTE 8 |
| 5 | 3 | 0 | EXECUTE 32 | --- | though
MULTI-CORE PROCESSOR WITH EXTERNAL INSTRUCTION EXECUTION RATE HEARTBEAT

CROSS REFERENCE TO RELATED APPLICATION(S)

This application claims priority based on U.S. Provisional Application Ser. No. 61/314,253, filed Mar. 16, 2010, entitled MULTI-CORE PROCESSOR WITH EXTERNAL INSTRUCTION EXECUTION RATE HEARTBEAT, and on U.S. Provisional Application Ser. No. 61/297,505, filed Jan. 22, 2010, entitled SIMULTANEOUS EXECUTION RESUMPTION OF MULTIPLE PROCESSOR CORES AFTER CORE STATE INFORMATION DUMP TO FACILITATE DEBUGGING VIA MULTI-CORE PROCESSOR SIMULATOR USING THE STATE INFORMATION, which are hereby incorporated by reference in their entirety.

FIELD OF THE INVENTION

The present invention relates in general to the field of multi-core microprocessors, and particularly to monitoring instruction execution therein.

BACKGROUND OF THE INVENTION

Modern microprocessors are extremely complex, and the task of debugging them is a difficult one. Microprocessor designers commonly use a software functional model that simulates the architectural behavior of the microprocessor as a debugging tool. A software functional model can be very useful because it can simulate the execution of a large number of instructions quickly relative to other software models, such as a Verilog simulator. A software functional model executes a single instruction at a time according to the architectural definition. A software functional model is very useful for debugging a single core processor.

The software functional model may also be used to debug a multi-core processor. A different respective instance of the software functional model may be used to simulate the execution of instructions on each of the cores. This works well as long as the cores are not interacting with one another. However, there are some multi-core processor bugs that only manifest in the context of memory access interactions between the multiple cores, particularly when the cores are sharing a memory location, such as a software semaphore. The memory accesses to a shared memory location are essentially asynchronous to each other. For example, consider the case in which a first core is looping reading a semaphore waiting for a second core to write the semaphore. Unless the two instances of the software functional model execute their instructions in a manner that sufficiently approximates the order in which the actual processor executes instructions when the bug manifests, the software functional model tool may not be very useful in debugging the dual-core processor. Therefore, what is needed is a way to control the order in which the simulated cores execute instructions relative to one another that approximates the order of the post-silicon multi-core processor.

BRIEF SUMMARY OF INVENTION

In one aspect the present invention provides a method for debugging a microprocessor having a plurality of cores. The method includes causing the microprocessor to perform an actual execution of instructions and obtaining from the microprocessor heartbeat information that specifies an actual execution sequence of the instructions by the plurality of cores relative to one another. The method also includes commanding a corresponding plurality of instances of a software functional model of the plurality of cores to execute the instructions according to the actual execution sequence specified by the heartbeat information to generate simulated results of the execution of the instructions. The method also includes comparing the simulated results with actual results of the execution of the instructions to determine whether they match.

In another aspect, the present invention provides a microprocessor. The microprocessor includes a plurality of processing cores, each configured to output an instruction execution indicator that indicates the number of instructions executed by the core during each clock cycle of the core. The microprocessor also includes a heartbeat generator coupled to receive the instruction execution indicator from each of the plurality of processing cores. The heartbeat generator is configured to generate a heartbeat indicator for each of the plurality of processing cores on a bus external to the microprocessor in response to the instruction execution indicators. The heartbeat indicator indicates the number of instructions executed by each of the plurality of processing cores during each clock cycle of the external bus.

In yet another aspect, the present invention provides a microprocessor. The microprocessor includes a plurality of processing cores, each configured to generate an indication of the number of instructions executed by the core during each clock cycle of the core. The microprocessor also includes a memory array configured to store the indications generated by the plurality of processing cores for a sequence of core clock cycles. The microprocessor also includes a bus interface unit, configured to couple to a bus external to the microprocessor. The bus interface unit is configured to write the indications stored in the memory array to a memory external to the microprocessor.

BRIEF DESCRIPTION OF THE DRAWINGS

FIG. 10 is a block diagram illustrating the dual-core processor of FIG. 1 according to an alternate embodiment.

FIG. 11 is a table illustrating an example operation of the rate controller of FIG. 2 according to the embodiment of FIG. 10.

DETAILED DESCRIPTION OF THE INVENTION

Described herein are embodiments of a multi-core processor configured to generate heartbeat signals that indicate the rate at which each core is executing instructions relative to one another. The processor designer captures the heartbeat signals as the processor operates and uses the captured heartbeat information to dynamically control the rate at which the software functional model executes instructions for each core. In this way, the heartbeat signals provide visibility into the inner workings of the multi-core processor needed by the software functional model to control the order in which the simulated cores execute instructions relative to one another that approximates the order of the actual multi-core processor that is exhibiting a bug. In some embodiments, the processor provides the heartbeat signal information on the architectural processor bus. However, because this may affect the timing of program execution on the multi-core processor, it may cause some bugs to go away when the heartbeats are enabled. Therefore, in preferred embodiments, the processor non-invasively provides the heartbeat signals on an external sideband bus rather than on the architectural processor bus.

Figure 1:
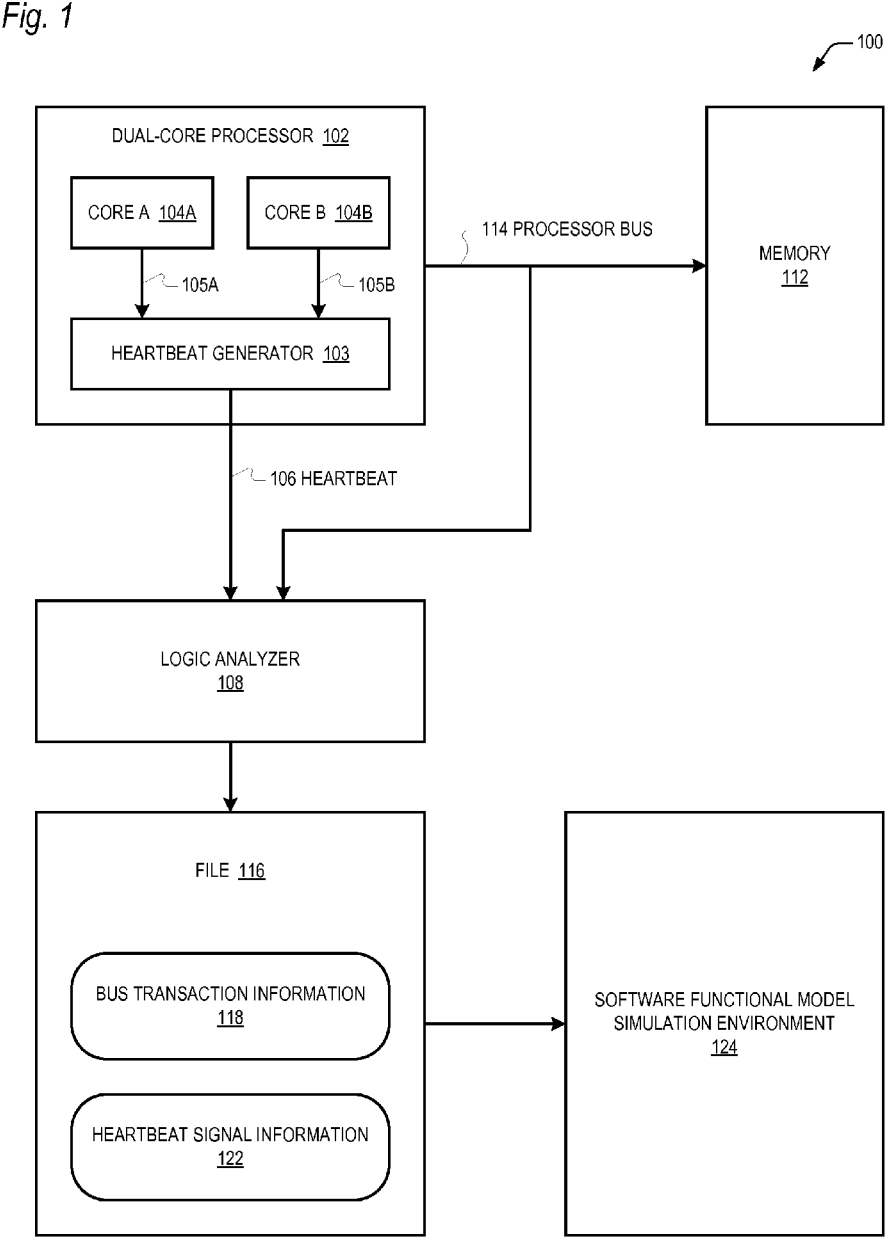
FIG. 1 is a block diagram illustrating a computing system that includes a dual-core processor that generates heartbeat signals according to the present invention.

Referring now to FIG. 1, a block diagram illustrating a computing system 100 that includes a dual-core processor 102 that generates heartbeat signals 106 according to the present invention is shown. The computing system 100 includes a dual-core processor 102. The dual-core processor 102 includes two cores, referred to individually as core A 104A and core B 104B and referred to collectively as 104. The cores 104A and 104B are also referred to individually as core 104 when it is unnecessary to distinguish them. In one embodiment, each core 104 of the dual-core processor 102 is a microprocessor core conforming to the VIA Nano™ architecture designed by VIA Technologies, Inc. Although dual-core processor embodiments are described herein, other embodiments are contemplated in which the processor has more than two cores, and the heartbeat signals 106 specify information for each of the more than two cores.

The dual-core processor 102 also includes a heartbeat generator 103, coupled to each of the cores 104. Specifically, core A 104A generates an instruction execution indicator 105A that indicates the number of instructions it has executed in the given core clock cycle, and core B 104B generates an instruction execution indicator 105B that indicates the number of instructions it has executed in the given core clock cycle. The heartbeat generator 103 generates the heartbeat signals 106 to indicate that the cores 104 have executed instructions in response to the instruction execution indicators 105. In one embodiment, the cores 104 perform speculative execution of instructions, and the instruction execution indicators 105 indicate to the heartbeat generator 103 that instructions have been retired, i.e., have updated the architectural state of the core 104 as opposed to merely speculatively executed.

The computing system 100 also includes memory 112 coupled to the dual-core processor 102. Each core 104 of the processor 102 may be programmed to periodically stop executing user program instructions, dump its current state to a predetermined location in memory 112, and flush its caches to memory 112, which is referred to herein as a checkpoint. The core 104 state includes the state of its internal registers, which is referred to herein as a checkpoint state. More specifically, each core 104 may be programmed by the designer to continuously execute a predetermined number of instructions (e.g., 100,000), stop executing instructions and dump a checkpoint state and flush its caches, resume executing instructions until it has again executed the predetermined number of instructions, stop executing instructions and dump a checkpoint state and flush its caches, and so forth.

The computing system 100 also includes a logic analyzer 108. In one embodiment, the logic analyzer 108 comprises one of the cores 104 within the multi-core processor 102. The logic analyzer 108 monitors the processor bus 114 and captures transactions thereon, including the transactions that write the checkpoint state to memory 112 and flush the caches. The logic analyzer 108 also monitors and captures the heartbeat signals 106. The logic analyzer 108 saves the captured information to a file 116, such as on a disk drive. The file 116 includes the captured processor bus transaction information 118 and the captured heartbeat signal information 122. In one embodiment, the heartbeat signals 106 are provided on a sideband bus that is also the JTAG bus for the processor 102. In one embodiment, the sideband bus is also used by a separate service processor within the dual-core processor 102 chip.

The computing system 100 also includes a software functional model simulation environment 124. Typically, the software functional model simulation environment 124 comprises one or more computing systems distinct from the computer that includes the processor 102. The software functional model simulation environment 124 uses the captured processor bus transaction information 118 and heartbeat signal information 122 stored in the file 116 to simulate the operation of the dual-core processor 102, as described in more detail below.

Figure 2:
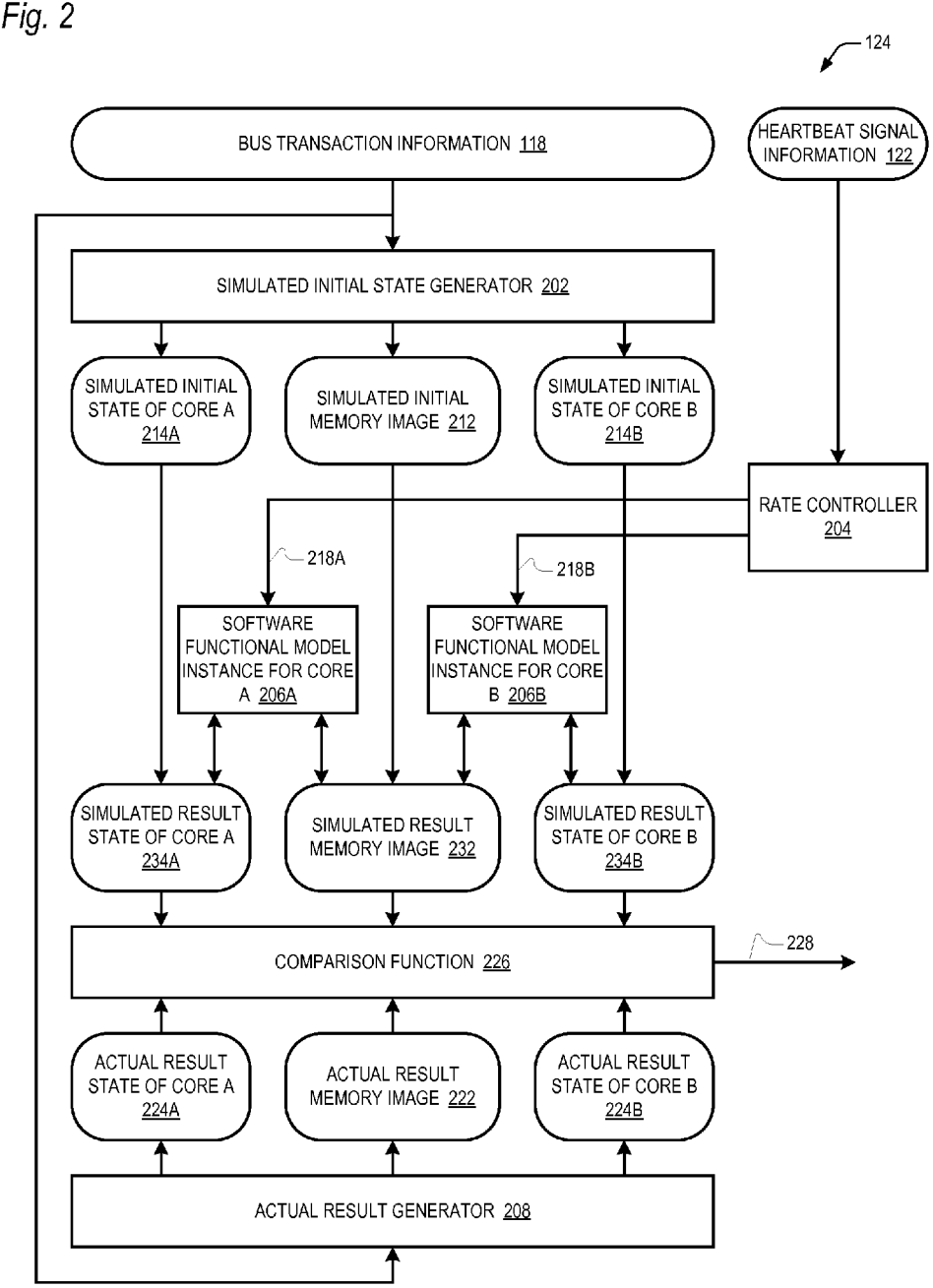
FIG. 2 is a block diagram illustrating in more detail the software functional model simulation environment of FIG. 1.

Referring now to FIG. 2, a block diagram illustrating in more detail the software functional model simulation environment 124 of FIG. 1 is shown. The simulation environment 124 includes a simulated initial state generator 202, a rate controller 204, a software functional model instance for core A 206A, a software functional model instance for core B 206B, an actual result generator 208, and a comparison function 226. Preferably, these elements are software components. However, other embodiments are contemplated in which all or portions of them are implemented in hardware for increased speed.

The simulated initial state generator 202 receives as input the captured processor bus transaction information 118, which it uses to generate a simulated initial memory image 212, a simulated initial state of core A 214A, and a simulated initial state of core B 214B. Subsequently, the simulated initial memory image 212 is copied to a simulated result memory image 232, the simulated initial state of core A 214A is copied to a simulated result state of core A 234A, and the simulated initial state of core B 214B is copied to a simulated result state of core B 234B. For ease of description, assume each core 104 has dumped a first checkpoint state (which includes the state of its internal registers, as discussed above) and flushed its caches, resumed operation and executed the predetermined number of instructions, and dumped a second checkpoint state and flushed its caches; and further assume that the transaction information 118 includes the bus transactions for both the first and second checkpoints and all bus transactions in between, which are caused by the execution of the predetermined number of instructions. See U.S. Provisional Application Ser. No. 61/297,505, filed Jan. 22, 2010 for a description of a method of synchronizing checkpoints between the two cores 104.

According to one embodiment, the simulated initial state generator 202 generates the simulated initial memory image 212 by: (1) detecting each transaction in between the first and second checkpoints in which the processor 102 reads a location in memory 112; (2) determining whether the read transaction is the first read from the location in between the first and second checkpoints; (3) if so, creating a memory location record for the transaction that includes the memory location address and the value of the data read. By this method, the simulated initial state generator 202 generates a sparse simulated initial memory image 212; however, the sparse image is sufficient to supply the needs of the software functional model instances 206, since the software functional model instances 206, during the interval between the first and second checkpoints, will only need to read the memory locations created by this method; otherwise, this indicates a bug in the actual processor 102.

The simulated initial state generator 202 generates the simulated initial state of core A 214A directly from the first checkpoint state captured in the transaction information 118. According to one embodiment, as mentioned above, at each checkpoint each core 104 writes its state information according to a predetermined format to a respective predetermined location in memory 112, which enables the simulated initial state generator 202 to find the first checkpoint state of core A 104A within the transaction information 118. The simulated initial state generator 202 generates the simulated initial state of core B 214B directly from the first checkpoint state captured in the transaction information 118 in a similar manner.

The actual result generator 208 receives as input the captured processor bus transaction information 118 of FIG. 1, which it uses to generate an actual result state of core A 224A, an actual result state of core B 224B, and an actual result memory image 222. The actual result generator 208 generates the actual result state of core A 224A directly from the second checkpoint state information captured in the transaction information 118. According to one embodiment, as mentioned above, at each checkpoint each core 104 writes its checkpoint state according to a predetermined format to a respective predetermined location in memory 112, which enables the actual result generator 208 to find the second checkpoint state of core A 104A within the transaction information 118. The actual result generator 208 generates the actual result state of core B 224B directly from the second checkpoint state captured in the transaction information 118 in a similar manner. As discussed below, the comparison function 226 will compare the actual result state of core A 224A with a simulated result state of core A 234A and will compare the actual result state of core B 224B with a simulated result state of core B 234B.

According to one embodiment, the actual result generator 208 generates the actual result memory image 222 by: (1) detecting each transaction in between the first and second checkpoints in which the processor 102 writes a location in memory 112, which includes the writes by each core 104 to memory locations to flush its internal caches at the second checkpoint; (2) determining whether the write transaction is the last write to the location in between the first and second checkpoints; (3) if so, creating a memory location record for the transaction that includes the memory location address and the value of the data written. By this method, the actual result generator 208 generates a sparse actual result memory image 222; however, the sparse image is sufficient to supply the needs of the software functional model instances 206, since the software functional model instances 206, during the interval between the first and second checkpoints, will only need to write to the memory locations created by this method; otherwise, this indicates a bug in the actual processor 102. As discussed below, the comparison function 226 will compare the actual result memory image 222 with a simulated result memory image 232.

The rate controller 204 receives as input the captured heartbeat signal information 122 of FIG. 1, which it uses to generate commands 218A to the software functional model instance for core A 206A and commands 218B to the software functional model instance for core B 206B. The commands 218 dynamically control the rate at which the software functional model instances 206 execute instructions relative to one another. In one embodiment, each command 218 instructs the software functional model instance 206 to execute N instructions, where N is specified in the command. In another embodiment, the software functional model instances 206 are multi-threaded and communicate with one another, e.g., via semaphores. In this embodiment, the command instructs the software functional model instance 206 for one core 104 to execute X instructions and then pause until the other software functional model instance 206 for the other core 104 has executed Y instructions. The remaining Figures, discussed below, illustrate in more detail the manner in which the rate controller 204 uses the heartbeat signal information 122 to issue the commands 218 to dynamically control the rate at which the software functional model instances 206 execute instructions relative to one another.

Each software functional model instance 206 simulates the architectural behavior of a core 104. The software functional model instance for core A 206A reads and writes the simulated result state of core A 234A and the software functional model instance for core B 206B reads and writes the simulated result state of core B 234B. Additionally, each of the software functional model instances 206 reads and/or writes the simulated result memory image 232 as it executes memory access instructions, as commanded by the rate controller 204. In particular, data written to the simulated result memory image 232 by software functional model instance for core A 206A is seen by software functional model instance for core B 206B, and vice versa, which affects the simulated result state 234 of the respective core instances 206. At the completion of the execution of the predetermined number of instructions (e.g., 100,000) by each of the software functional model instances 206, the simulated initial state of core A 214A that was copied to the simulated result state of core A 234A will have been updated to become the true simulated result state of core A 234A, and the simulated initial state of core B 214B that was copied to the simulated result state of core B 214B will have been updated to become the true simulated result state of core B 234B. The comparison function 226 compares the simulated result state of core A 234A with the actual result state of core A 224A, and the comparison function 226 compares the simulated result state of core B 234B with the actual result state of core B 224B to determine whether the actual processor 102 manifested the bug during the interval between the first and second checkpoints, as indicated by the pass/fail indicator 228. Additionally, at the completion of the execution of the predetermined number of instructions (e.g., 100,000) by each of the software functional model instances 206, the value of the simulated initial memory image 212 that was copied to the simulated result memory image 232 will have been updated to become the true simulated result memory image 232. The comparison function 226 compares the simulated result memory image 232 to the actual result memory image 222 to determine whether the actual processor 102 manifested the bug during the interval between the first and second checkpoints, as indicated by the pass/fail indicator 228.

Thus, advantageously, through the medium of the rate controller 204, the heartbeat signal information 122 is used to dynamically control the rate at which each software functional model instance 206 executes instructions. That is, the rate controller 204 controls the order in which the software functional model instances 206 execute instructions relative to one another, such that the instructions are executed in proper order relative to memory accesses by each core 104 to accurately simulate the behavior that the actual processor 102 performed, or should have performed, from the actual initial state of each core 104 and the actual initial state of memory 112. This enables the comparison function 226 to compare the behavior of the actual processor 102 to its simulated behavior.

Figure 3:
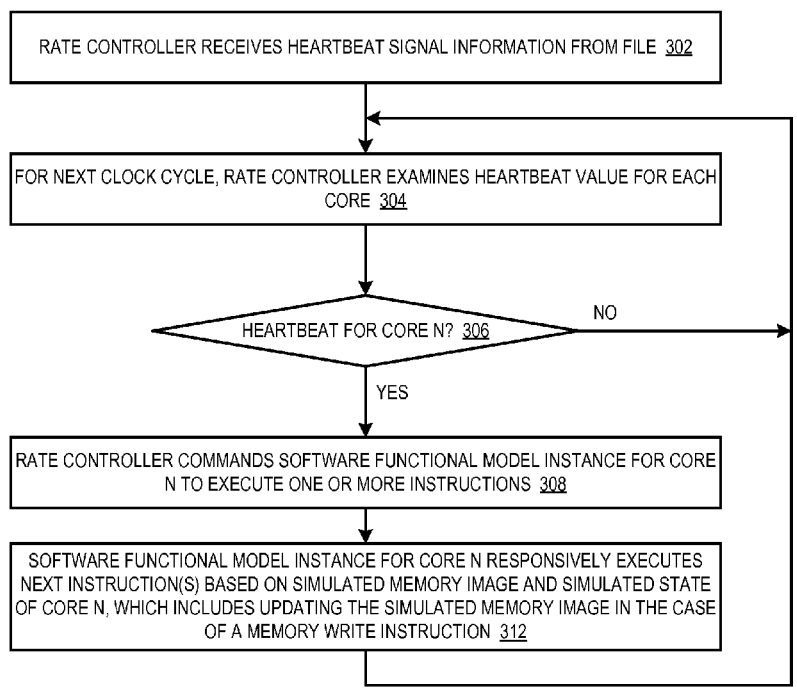
FIG. 3 is a flowchart illustrating operation of the simulation environment of FIG. 2.

Referring now to FIG. 3, a flowchart illustrating operation of the simulation environment 124 of FIG. 2 is shown. Advantageously, the operation of the simulation environment 124 according to FIG. 3 produces a simulated result memory image 232 and simulated result core states 234 according to block 1406 of FIG. 14 that may be compared with the actual result memory image 222 and actual result core states 224 according to block 1408 of FIG. 14, as discussed below. Flow begins at block 302.

At block 302, the rate controller 204 receives the heartbeat signal information 122 from the file 116. Flow proceeds to block 304.

At block 304, for the next clock cycle of the heartbeat signals 106 indicated in the heartbeat signal information 122, the rate controller 204 examines the value of the heartbeat signals 106 for each of the cores 104. The values of the heartbeat signal 106 according to various embodiments are discussed below with respect to the remaining Figures. Flow proceeds to decision block 306.

At decision block 306, the rate controller 204 determines whether a heartbeat was generated for core N, where core N is either core A 104A or core B 104B, of reach of the cores 104. If so, flow proceeds to block 308; otherwise, flow returns to block 304 to examine the next clock cycle.

At block 308, the rate controller 204 commands 218 the software functional model instance for core N 206 to execute one or more instructions based on the heartbeat information determined at decision block 306, as discussed below with respect to the remaining Figures. Flow proceeds to block 312.

At block 312, the software functional instance model for core N 206 executes the next instruction or instructions based on the simulated result memory image 232 and the simulated result state of core N 234. If the instruction is a memory read instruction, the software functional instance model for core N 206 reads the simulated result memory image 232. If the instruction is a memory write instruction, the software functional instance model for core N 206 updates the simulated result memory image 232. Flow returns to block 304 to examine the next clock cycle.

Various embodiments of the instruction execution indicators 105, heartbeat generator 103, heartbeat signals 106, and their uses by the rate controller 204 will now be described.

Figures 4, 5:
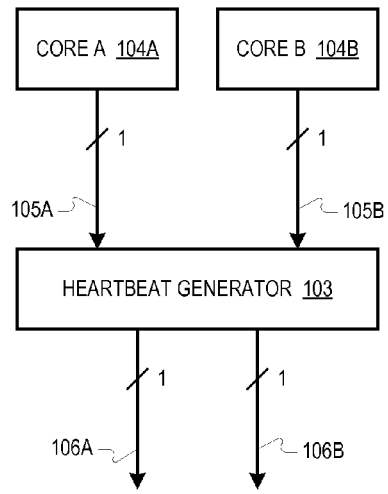
FIG. 4 is a block diagram illustrating the dual-core processor of FIG. 1 according to one embodiment.
FIG. 5 is a table illustrating an example operation of the rate controller of FIG. 2 according to the embodiment of FIG. 4.

Referring now to FIG. 4, a block diagram illustrating the dual-core processor 102 of FIG. 1 according to one embodiment is shown. In the embodiment of FIGS. 4 and 5, the core 104 clock rate is equal to the heartbeat signal 106 clock rate. Furthermore, each core 104 is capable of retiring a single instruction per core clock cycle. As shown, each core's instruction execution indicator 105 is a single bit that is true if the core 104 retired an instruction during the given core clock cycle and is false otherwise. Correspondingly, the heartbeat generator 103 generates a single bit heartbeat signal 106A that is true if core A 104A retired an instruction during the given core clock cycle and is false otherwise, and the heartbeat generator 103 generates a single bit heartbeat signal 106B that is true if core B 104B retired an instruction during the given core clock cycle and is false otherwise; however, it is noted that there may be a delay between generation of the instruction execution indicator 105 and its corresponding heartbeat signal 106. In one embodiment, the cores 104 and the heartbeat signal bus 106 operate off of different clock sources, and the heartbeat generator 103 includes synchronization logic that synchronizes the instruction execution indicator signals 105 and the heartbeat signals 106.

Referring now to FIG. 5, a table illustrating an example operation of the rate controller 204 of FIG. 2 according to the embodiment of FIG. 4 is shown. The table includes six clock cycles, denoted 0 through 5, corresponding to six clocks indicated in the heartbeat signal information 122 received by the rate controller 204, according to block 302 of FIG. 3. For each clock cycle, the values of the core A 104A heartbeat signal 106A and core B 104B heartbeat signal 106B received by the rate controller 204 from the heartbeat signal information 122, according to block 304 of FIG. 3, are shown. Additionally, for each clock cycle, in response to the decision made at block 306 of FIG. 3, the table indicates whether the rate controller 204 commands 218A the software functional model instance for core A 206A to execute an instruction and whether the rate controller 204 commands 218B the software functional model instance for core B 206 B to execute an instruction during the corresponding simulated clock cycles, according to block 308 of FIG. 3. In the example, the heartbeat signal 106A for core A 104A was true during clocks 1 and 3-5; thus, the rate controller 204 commands 218A the software functional model instance for core A 206A to execute an instruction during simulated clocks 1 and 3-5. Furthermore, in the example, the heartbeat signal 106B for core B 104B was true during clocks 0-2 and 4; thus, the rate controller 204 commands 218B the software functional model instance for core B 206B to execute an instruction during simulated clocks 0-2 and 4.

Figures 6, 7:
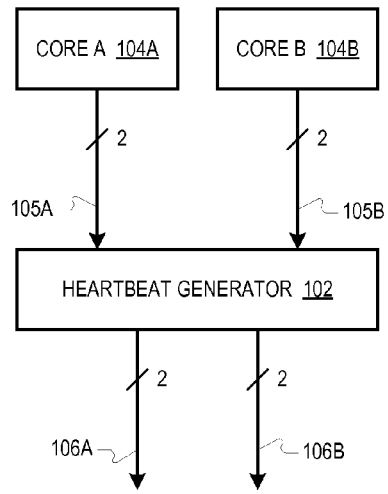
FIG. 6 is a block diagram illustrating the dual-core processor of FIG. 1 according to an alternate embodiment.
FIG. 7 is a table illustrating an example operation of the rate controller of FIG. 2 according to the embodiment of FIG. 6.

Referring now to FIG. 6, a block diagram illustrating the dual-core processor 102 of FIG. 1 according to an alternate embodiment is shown. The embodiment of FIGS. 6 and 7 is similar to the embodiment of FIGS. 4 and 5 in that the core 104 clock rate is equal to the heartbeat signal 106 clock rate. However, in the embodiment of FIGS. 6 and 7, each core 104 is capable of retiring multiple instructions per core clock cycle. In the example, each core 104 is capable of retiring three instructions per core clock cycle (although other embodiments are contemplated in which the number is different). As shown, each core's instruction execution indicator 105 is two bits that indicate the number of instructions retired by the core 104 during the given core clock cycle. Correspondingly, the heartbeat generator 103 generates a two-bit heartbeat signal 106A that indicates the number of instructions retired by core A 104A during the given core clock cycle, and the heartbeat generator 103 generates a two-bit heartbeat signal 106B that indicates the number of instructions retired by core B 104B during the given core clock cycle.

Referring now to FIG. 7, a table illustrating an example operation of the rate controller 204 of FIG. 2 according to the embodiment of FIG. 6 is shown. The table is similar to the table of FIG. 5. However as shown, for each clock cycle, the value of the heartbeat signals 106 received by the rate controller 204 from the heartbeat signal information 122 may have the values zero through three, rather than a true or false value, according to block 304 of FIG. 3. Similarly, for each clock cycle, in response to the decision made at block 306 of FIG. 3, the table indicates whether the rate controller 204 commands 218A the software functional model instance for core A 206A to execute an instruction (and if so how many instructions) and whether the rate controller 204 commands 218B the software functional model instance for core B 206 B to execute an instruction (and if so how many instructions) during the corresponding simulated clock cycles, according to block 308 of FIG. 3. In the example, the heartbeat signal 106A for core A 104A was zero during clocks 0 and 2, one during clock 4, two during clock 3, and three during clocks 1 and 5; thus, the rate controller 204 commands 218A the software functional model instance for core A 206A to execute zero instructions during simulated clocks 0 and 2, one instruction during simulated clock 4, two instructions during simulated clock 3, and three instructions during clocks 1 and 5. Furthermore, in the example, the heartbeat signal 106B for core B 104B was zero during clocks 3 and 5, one during clocks 0 and 4, two during clocks 1 and 2, and three during none of the six clocks in the example; thus, the rate controller 204 commands 218B the software functional model instance for core B 206B to execute zero instructions during simulated clocks 3 and 5, one instruction during simulated clocks 0 and 4, two during simulated clocks 1 and 2, and three instructions during none of the clocks.

Figures 8, 9:
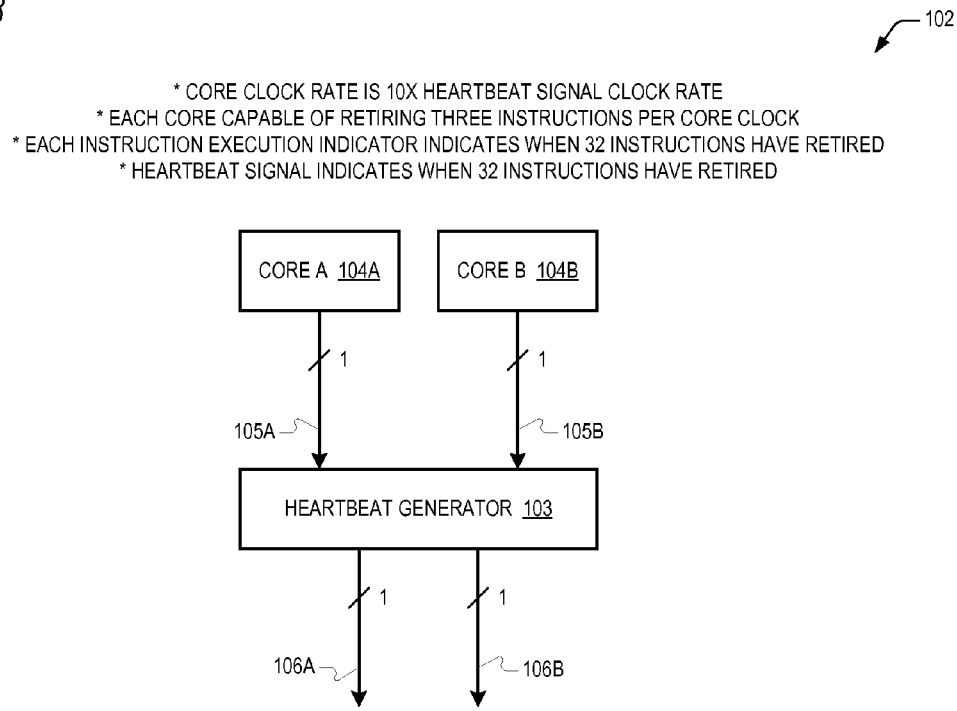
FIG. 8 is a block diagram illustrating the dual-core processor of FIG. 1 according to an alternate embodiment.
FIG. 9 is a table illustrating an example operation of the rate controller of FIG. 2 according to the embodiment of FIG. 8.

Referring now to FIG. 8, a block diagram illustrating the dual-core processor 102 of FIG. 1 according to an alternate embodiment is shown. The embodiment of FIGS. 8 and 9 is similar to the embodiment of FIGS. 6 and 7 in that each core 104 is capable of retiring multiple instructions per core clock cycle. However, in the embodiment of FIGS. 8 and 9, the core 104 clock rate is a multiple of the heartbeat signal 106 clock rate. In the example, the core clock rate is ten times the heartbeat signal 106 clock rate (although other embodiments are contemplated in which the ratio is different). Furthermore, each core's instruction execution indicator 105 is a single bit that is true when the core 104 retires a predetermined number of instructions; otherwise, the instruction execution indicator 105 is false. In one embodiment, the predetermined number is 32, although other embodiments are contemplated in which the predetermined number is different; specifically, the value should be at least as great as the product of the clock ratio and the maximum number of instructions that each core 104 can retire in a given core clock cycle. In one embodiment, the retire unit of each core 104 includes a counter that is incremented by the number of retired instructions each core clock cycle, and the instruction execution indicator 105 is effectively bit M ($M=\log_2 N$) of the counter, where N is the product of the clock ratio and the maximum number of instructions that each core 104 can retire in a given core clock cycle. Correspondingly, the heartbeat generator 103 generates a one-bit heartbeat signal 106A that follows the instruction execution indicator 105A and a one-bit heartbeat signal 106B that follows the instruction execution indicator 105B.

Referring now to FIG. 9, a table illustrating an example operation of the rate controller 204 of FIG. 2 according to the embodiment of FIG. 8 is shown. The table is similar to the table of FIG. 5. However, it is noted that in FIGS. 5 and 7, since the core clock rate and the heartbeat signal 106 clock rate are the same, the heartbeat information 122 for each clock cycle indicates that one or more instructions was retired in a corresponding core clock cycle; thus, the clock cycles shown (0 through 5) correspond to both the core clock and the heartbeat signal 106 clock. However, in FIG. 9 (and FIG. 11, discussed below), the heartbeat information 122 for each clock cycle indicates the number of instructions that were retired in multiple core clock cycles; thus, the clock cycles shown correspond to the heartbeat signal 106 clock. Furthermore, for each clock cycle, in response to the decision made at block 306 of FIG. 3, the table indicates whether the rate controller 204 commands 218A the software functional model instance for core A 206A to execute 32 instructions and whether the rate controller 204 commands 218B the software functional model instance for core B 206 B to execute 32 instructions during the corresponding simulated clock cycles, according to block 308 of FIG. 3. In the example, the heartbeat signal 106A for core A 104A was true during clocks 1 and 5; thus, the rate controller 204 commands 218A the software functional model instance for core A 206A to execute 32 instructions during the 32 simulated clocks that occurred during heartbeat signal 106 bus clocks 1 and 5. Furthermore, in the example, the heartbeat signal 106B for core B 104B was true during clocks 0, 2 and 4; thus, the rate controller 204 commands 218B the software functional model instance for core B 206B to execute 32 instructions during the 32 simulated clocks that occurred during heartbeat signal 106 bus clocks 0, 2 and 4.

Referring now to FIG. 10, a block diagram illustrating the dual-core processor 102 of FIG. 1 according to an alternate embodiment is shown. The embodiment of FIGS. 10 and 11 is similar to the embodiment of FIGS. 8 and 9 in that each core 104 is capable of retiring multiple instructions per core clock cycle, the core 104 clock rate is a multiple of the heartbeat signal 106 clock rate, and each of the one-bit heartbeat signals 106 is true when the corresponding core 104 retires a predetermined number of instructions (e.g., 32); otherwise, the instruction execution indicator 105 is false. However, in the embodiment of FIGS. 10 and 11, each core's instruction execution indicator 105 is two bits that indicate the number of instructions retired by the core 104 during the given core clock cycle, similar to the embodiment of FIG. 6. In the embodiment of FIG. 10, the heartbeat generator 103 is configured to generate a true value on a heartbeat signal 106 once the corresponding core 104 has retired the predetermined number of instructions. In one embodiment, the heartbeat generator 103 includes a counter for each core 104 that is incremented by the corresponding instruction execution indicator 105 value each core clock cycle, and the heartbeat signal 106 is effectively bit M ($M=\log_2 N$) of the counter.

Referring now to FIG. 11, a table illustrating an example operation of the rate controller 204 of FIG. 2 according to the embodiment of FIG. 10 is shown. The table is similar to the table of FIG. 9. This is because from the perspective of the rate controller 204, the received heartbeat signal information 122 is the same and denotes the same information as the embodiment of FIG. 9.

Figures 12, 13:
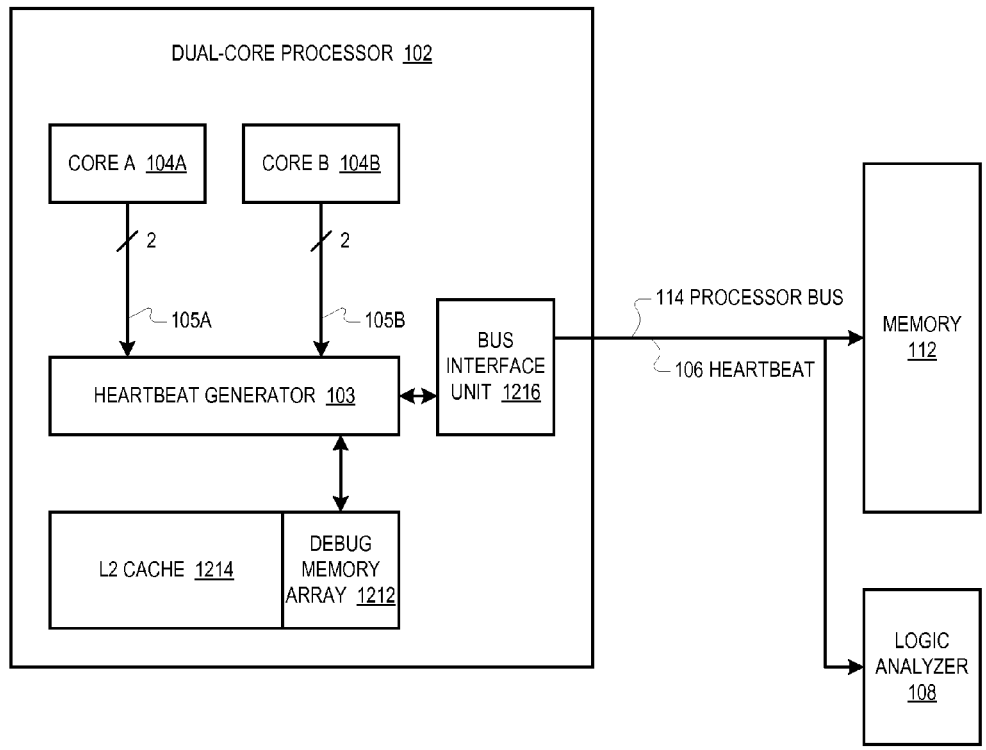
FIG. 12 is a block diagram illustrating the dual-core processor of FIG. 1 according to an alternate embodiment.
FIG. 13 is a table illustrating an example operation of the rate controller of FIG. 2 according to the embodiment of FIG. 12.

Referring now to FIG. 12, a block diagram illustrating the dual-core processor 102 of FIG. 1 according to an alternate embodiment is shown. The embodiment of FIGS. 12 and 13 is similar to the embodiment of FIGS. 10 and 11 in that each core 104 is capable of retiring multiple instructions per core clock cycle, the core 104 clock rate is a multiple of the heartbeat signal 106 clock rate, and each core's instruction execution indicator 105 is two bits that indicate the number of instructions retired by the core 104 during the given core clock cycle. However, the embodiment of FIG. 12 also includes a debug memory array 1212. The heartbeat generator 103 is configured to write heartbeat signal information to the debug memory array 1212 in response to the instruction execution indicators 105. In one embodiment, the heartbeat generator 103 writes to the debug memory array 1212 the value of each instruction execution indicator 105 received each clock cycle. The heartbeat generator 103 subsequently reads the heartbeat signal information from the debug memory array 1212 and writes it to the system memory 112 over the processor bus 114. The logic analyzer 108 captures the heartbeat signal information off the processor bus 114 as it is written to memory 112. The heartbeat generator 103 writes the heartbeat signal information to a predetermined location in the system memory 112, which enables the logic analyzer 108 to save it to the file 116 as heartbeat signal information 122, which is later used by the rate controller 204 according to FIG. 3. In one embodiment, the heartbeat signal information 122 according to the embodiment of FIGS. 12 and 13 is similar to the heartbeat signal information 122 described with respect to the embodiment of FIGS. 6 and 7. That is, the heartbeat signal information 122 associated with each core clock cycle indicates the number of instructions retired by each core 104 during the clock cycle. The heartbeat generator 103 generates requests to a bus interface unit 1216 of the dual-core processor 102 that interfaces the dual-core processor 102 to the processor bus 114. According to one embodiment, the requests generated by the heartbeat generator 103 are the lowest priority type of requests that may be made to the bus interface unit 1216, and the bus interface unit 1216 responsively attempts to generate transactions on the processor bus 114 to write the heartbeat signal information from the debug memory array 1212 to the system memory 112 when the processor bus 114 is idle. This potentially reduces the likelihood that the invasive nature of writing the heartbeat signal information on the processor bus 114 (in contrast to writing the heartbeat signal information on the non-invasive sideband heartbeat signal 106 bus as in the embodiments of FIGS. 4 through 11 and 15 through 16) will affect the timing of operations by the dual-core processor 102 such that the bug will no longer manifest itself when the heartbeat feature is enabled. The heartbeat generator 103 monitors the fullness of the debug memory array 1212 and communicates with the bus interface unit 1216 to increase the priority of the requests to write the heartbeat signal information if the debug memory array 1212 becomes full enough that the likelihood of overflowing the debug memory array 1212 becomes unacceptably high. In one embodiment, the debug memory array 1212 may be a memory array similar to the memory array of an L2 cache memory 1214 of the dual-core processor 102 that is shared by the cores 104. Advantageously, the dual-core processor 102 may be configured such that the debug memory array 1212 is an adjunct of the L2 cache 1214 and thereby be able to share common control logic and layout benefits thereof. In one embodiment, the size of the debug memory array 1212 is sufficiently large such that, for a sufficiently small interval between pairs of checkpoints, the heartbeat generator 103 need not write the heartbeat signal information to memory 112 until a checkpoint is reached, which is advantageous because it essentially makes the nature of the writing of the heartbeat signal information non-invasive.

Referring now to FIG. 13, a table illustrating an example operation of the rate controller 204 of FIG. 2 according to the embodiment of FIG. 12 is shown. The table is similar to the table of FIG. 7. This is because from the perspective of the rate controller 204, the received heartbeat signal information 122 is the same and denotes the same information as the embodiment of FIG. 7. It is noted that since there is no heartbeat signal 106 clock with respect to the embodiment of FIG. 12 and the heartbeat information 122 for each clock cycle indicates the number of instructions retired in a core clock cycle, the clock cycles shown (0 through 5) in FIG. 13 correspond to core clock cycles.

Relative advantages and disadvantages of the embodiments described above will now be discussed. The embodiments of FIGS. 4 and 5 and FIGS. 8 through 13 have the advantage that they require a relatively small number of external pins on the multi-core processor 102 package, namely one pin per core 104; thus, these embodiments are more scalable than the embodiment of FIGS. 6 and 7, for example, that requires multiple pins per core 104, which may be important for embodiments with a relatively large number of cores 104. The embodiment of FIGS. 4 and 5 has the limitation that each core 104 only retires a single instruction per core clock cycle; whereas, many modern microprocessor cores are superscalar and capable of retiring multiple instructions per core clock cycle. In contrast, the embodiments of FIGS. 6 through 13 have the advantage that they support cores 104 that are capable of retiring multiple instructions per core clock cycle. Additionally, the embodiments of FIGS. 4 through 7 have the limitation that the core clock and heartbeat signal 106 bus clock rates are the same; whereas, the core clock rates of many modern microprocessors is so high that it is not practical to run an external bus at the core clock rate. In contrast, the embodiments of FIGS. 8 through 13 and 15 through 16 (discussed below) have the advantage that they support a configuration in which the heartbeat signal 106 bus frequency is a fraction of the core clock frequency. As discussed above, the embodiment of FIGS. 12 and 13 has the potential disadvantage that it is invasive and may affect the timing of program execution on the multi-core processor, which may cause some bugs to go away when the heartbeats are enabled. However, the embodiment of FIGS. 12 and 13 has the advantage that it does not require additional external pins, which may be necessary in some embodiments.

Figure 14:
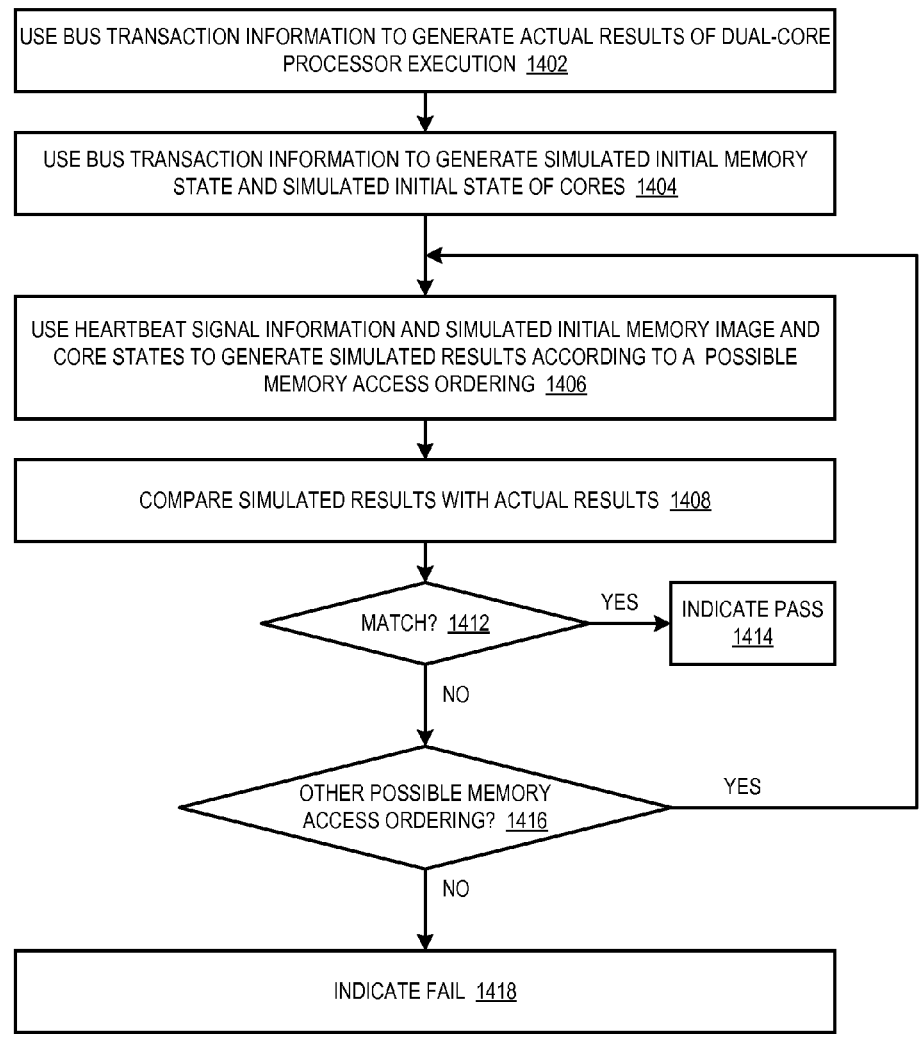
FIG. 14 is a flowchart illustrating operation of the simulation environment of FIG. 2.

Referring now to FIG. 14, a flowchart illustrating operation of the simulation environment 124 of FIG. 2 is shown. Advantageously, the operation of the simulation environment 124 according to FIG. 14 may be used to determine whether a failure occurred between a pair of first and second checkpoints, as described herein. Although FIG. 14 describes the operation of the simulation environment 124 to determine whether a failure occurred between a pair of first and second checkpoints, the operation of the simulation environment 124 may be performed multiple times to determine whether a failure occurred between multiple pairs of first and second checkpoints stored within the file 116 of FIG. 1 for a relatively lengthy period of operation of the system 100 that includes many checkpoints. Flow begins at block 1402.

At block 1402, the actual result generator 208 uses the bus transaction information 118 to generate the actual result memory image 222 and actual result state of the cores 224 of the execution of the predetermined number of instruction by the dual-core processor 102 of FIG. 1 between two checkpoints, as described above, mainly with respect to FIG. 2. Flow proceeds to block 1404.

At block 1404, the simulated initial state generator 202 uses the bus transaction information 118 to generate the simulated initial memory image 212 and simulated initial state of the cores 214, as described above, mainly with respect to FIG. 2. Flow proceeds to block 1406.

At block 1406, the simulated initial memory image 212 is copied to the simulated result memory image 232, the simulated initial state of the core A 214A is copied to the simulated result state of the core A 234A, and the simulated initial state of the core B 214B is copied to the simulated result state of the core B 234B. Subsequently, the rate controller 204 and software functional models 206 use and update the simulated result memory image 232 and simulated result state of the cores 234, as described above with respect to FIG. 3. It is noted with respect to the operation of FIG. 3 that one of the cores 104 may execute a memory write instruction and the other core 104 may execute a memory read instruction to the same memory location within one or more instructions of each other, such as the semaphore write and read scenario described above. If the number of instructions between the write and read is less than the granularity provided by the heartbeat signal information 122, then multiple possibilities exist concerning the actual order in which the memory accesses occurred during the actual execution of the dual-core processor 102. Therefore, the simulation environment 124 detects this condition, assumes a possible ordering of the memory accesses, performs block 1406 with the assumed possible ordering, and notes its use. It is noted that the embodiments of FIGS. 8 through 11 produce heartbeat signal information 122 that has coarser granularity than the embodiments of FIGS. 6 through 7 and FIGS. 12 and 13, and the embodiments of FIGS. 12 and 13 have even coarser granularity than the embodiments of FIGS. 4 and 5. The coarser granularity is potentially disadvantageous because it may require more time for the simulation environment 124 to complete the process of FIG. 14 because the possible number of memory access orderings may be larger. Flow proceeds to block 1408.

At block 1408, the comparison function 226 compares the simulated results generated at block 1406 with the actual results generated at block 1402. Flow proceeds to decision block 1412.

At decision block 1412, the comparison function 226 determines whether the results compared at block 1408 match. If so, flow proceeds to block 1414; otherwise, flow proceeds to decision block 1416.

At block 1414, the comparison function 226 generates a pass value on the pass/fail indicator 228. Flow ends at block 1414.

At block 1416, the simulation environment 124 determines whether there are other possible memory access orderings that have not been used to perform block 1406; if so, flow returns to block 1406 to use a different one of the other possible memory access orderings that have not been used; otherwise, flow proceeds to block 1418.

At block 1418, the comparison function 226 generates a fail value on the pass/fail indicator 228. Flow ends at block 1418.

Figures 15, 16:
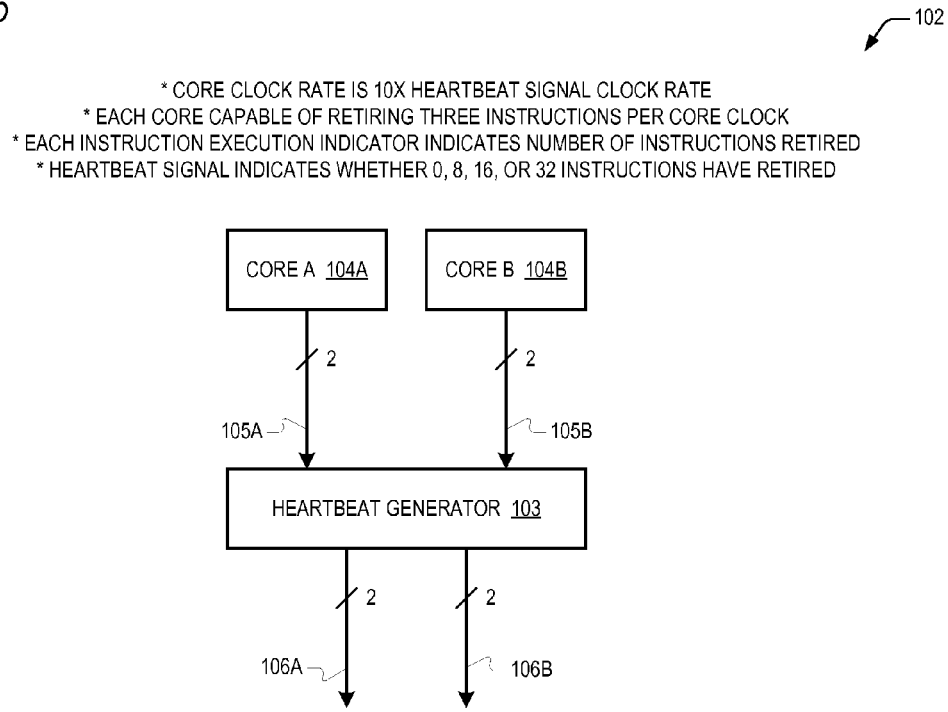
FIG. 15 is a block diagram illustrating the dual-core processor of FIG. 1 according to an alternate embodiment.
FIG. 16 is a table illustrating an example operation of the rate controller of FIG. 2 according to the embodiment of FIG. 15.

Referring now to FIG. 15, a block diagram illustrating the dual-core processor 102 of FIG. 1 according to an alternate embodiment is shown. The embodiment of FIGS. 15 and 16 is similar to the embodiment of FIGS. 10 and 11 in that each core 104 is capable of retiring multiple instructions per core clock cycle, the core 104 clock rate is a multiple of the heartbeat signal 106 clock rate, and each core's instruction execution indicator 105 is two bits that indicate the number of instructions retired by the core 104 during the given core clock cycle. However, in the embodiment of FIG. 15, each bus clock cycle, the heartbeat generator 103 is configured to generate a two-bit heartbeat signal 106A that indicates whether 0, 8, 16, or 32 instructions were retired by core A 104A and a two-bit heartbeat signal 106B that indicates whether 0, 8, 16, or 32 instructions were retired by core B 104B.

Referring now to FIG. 16, a table illustrating an example operation of the rate controller 204 of FIG. 2 according to the embodiment of FIG. 15 is shown. The table is similar in some respects to the table of FIGS. 7, 9 and 11. As shown, for each clock cycle, the value of the heartbeat signals 106 received by the rate controller 204 from the heartbeat signal information 122 may have the values zero through three. Similarly, for each clock cycle, in response to the decision made at block 306 of FIG. 3, the table indicates whether the rate controller 204 commands 218A the software functional model instance for core A 206A to execute an instruction (and if so how many instructions) and whether the rate controller 204 commands 218B the software functional model instance for core B 206 B to execute an instruction (and if so how many instructions) during the corresponding simulated clock cycles, according to block 308 of FIG. 3. In the example, the heartbeat signal 106A for core A 104A was zero during clocks 0 and 2, one during clock 4, two during clock 3, and three during clocks 1 and 5; thus, the rate controller 204 commands 218A the software functional model instance for core A 206A to execute zero instructions during simulated clocks 0 and 2, eight instructions during simulated clock 4, sixteen instructions during simulated clock 3, and 32 instructions during simulated clocks 1 and 5. Furthermore, in the example, the heartbeat signal 106B for core B 104B was zero during clocks 3 and 5, one during clocks 0 and 4, two during clocks 1 and 2, and three during no clocks; thus, the rate controller 204 commands 218B the software functional model instance for core B 206B to execute zero instructions during simulated clocks 3 and 5, eight instructions during simulated clocks 0 and 4, sixteen instructions during simulated clocks 1 and 2, and 32 instructions during no simulated clocks.

The embodiment of FIGS. 15 and 16 has the advantage that it provides finer granularity for the process performed according to FIG. 14 than, for example, the embodiments of FIGS. 8 through 11. Furthermore, embodiments are contemplated in which the heartbeat signals 106 may be used to accomplish even finer granularity in the case where a failure mode is being debugged that does not require all the cores 104 to be running to reproduce the bug/failure. For example, assume there eight heartbeat signals 106 available on the sideband bus, the multi-core processor 102 includes four cores 104, but only two of the cores 104 must be running to reproduce the bug. In this case, the heartbeat generator 103 may be programmed to use four of the eight heartbeat signal 106 bits for each core to indicate whether 0, 2, 4, 6, 8, 10, 12, 14, 16, 18, 20, 22, 24, 26, 28, or 32 instructions have been retired.

Although embodiments have been described in which each core 104 executes a single thread, other embodiments are contemplated in which each core 104 is configured to simultaneously execute multiple threads, and the heartbeat information indicates the thread of the retired instructions.

Additionally, although embodiment have been described in which both cores 104 have the same core clock rate, other embodiments are contemplated in which the two cores 104 have different core clock rates. The heartbeat signal information 122 indicates the two clock rates and the rate controller 204 takes this into account when generating the commands 218.

An alternative to the heartbeat embodiments described herein is to use a Verilog simulator of the processor design in place of the actual processor. Using the Verilog simulator essentially enables the debugger to access any net of the processor at any time, including signals that indicate the times at which each core executes instructions and accesses memory. This would enable the debugger to provide that information to the software functional model so that it can execute instructions and perform memory accesses at the same times as the actual processor—or at least as the Verilog simulation of the actual processor. However, there are three disadvantages to this approach. First, the Verilog simulator approach requires a very large amount of computing power/time, depending upon the number of clock cycles/instructions that must be simulated. The large amount of computing power/time potentially makes the Verilog simulation an impractical solution, at least for some classes of bugs. Second, there is always the possibility that the actual processor is behaving differently from the Verilog simulation. Third, the Verilog simulation solution requires the processor to be designed with perfect state-per-clock replay capability, which is difficult to implement. Broadly speaking, a microprocessor with perfect state-per-clock replay is capable of being loaded with an input state that defines the entire state of the processor; stated alternatively, there is no state of the processor that cannot be initialized by loading the input state. Advantageously, the heartbeat embodiments described herein does not suffer from these disadvantages of the Verilog simulation solution.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A method for debugging a microprocessor having a plurality of cores, the method comprising:
    causing the microprocessor to perform an actual execution of instructions;
    obtaining from the microprocessor heartbeat information that specifies an actual execution sequence of the instructions by the plurality of cores relative to one another;
    commanding a corresponding plurality of instances of a software functional model of the plurality of cores to execute the instructions according to the actual execution sequence specified by the heartbeat information to generate simulated results of the execution of the instructions; and
    comparing the simulated results with actual results of the execution of the instructions to determine whether they match.

2. The method of claim 1, wherein the actual and simulated results comprise a state of each of the plurality of cores at the end of the execution.

3. The method of claim 2, wherein the actual and simulated results further comprise a state of memory at the end of the execution.

4. The method of claim 1, further comprising:
    indicating a failure if the simulated results do not match the actual results.

5. The method of claim 1, wherein the number of instructions between a memory write instruction and a memory read instruction of the instructions to the same memory location is less than the granularity provided by the heartbeat information such that multiple possible execution sequences of the memory write and read instructions during the actual execution of the instructions exist, wherein said commanding comprises commanding the corresponding plurality of instances of a software functional model according to the multiple possible execution sequences until the simulated results match the actual results.

6. The method of claim 5, further comprising:
    indicating a failure if the simulated results do not match the actual results for any of the multiple possible execution sequences.

7. The method of claim 1, wherein the heartbeat information comprises a sequence of records associated with a sequence of heartbeats during the actual execution of the instructions, wherein each record indicates the number of instructions actually executed by each core prior to the heartbeat associated with the record, wherein said commanding comprises:
    for each record in the sequence of records, commanding each instance of the plurality of instances of the software functional model to execute the number of instructions actually executed by the corresponding core indicated by the record.

8. The method of claim 1, wherein said obtaining from the microprocessor the heartbeat information comprises capturing heartbeat signals generated by the microprocessor during the actual execution on a bus external to the microprocessor.

9. A microprocessor, comprising:
    a plurality of processing cores, each configured to output an instruction execution indicator that indicates the number of instructions executed by the core during each clock cycle of the core; and
    a heartbeat generator, coupled to receive the instruction execution indicator from each of the plurality of processing cores, wherein the heartbeat generator is configured to generate a heartbeat indicator for each of the plurality of processing cores on a bus external to the microprocessor in response to the instruction execution indicators, wherein the heartbeat indicator indicates the number of instructions executed by each of the plurality of processing cores during each clock cycle of the external bus.

10. The microprocessor of claim 9, wherein the core clock cycle rate and the external bus clock cycle rate are equal.

11. The microprocessor of claim 9, wherein the core clock cycle rate is greater than the external bus clock cycle rate, wherein the number of executed instructions indicated by each of the heartbeat indicators is greater than the largest possible number of executed instructions indicated by each of the instruction execution indicators.

12. The microprocessor of claim 11, wherein the ratio of the core clock cycle rate to the external bus clock cycle rate is J, wherein the largest possible number of executed instructions indicated by each of the instruction execution indicators is K, wherein the number of executed instructions indicated by each of the heartbeat indicators is L, wherein L is greater than or equal to the product of J and K.

13. The microprocessor of claim 9, wherein each of the heartbeat indicators comprises a single bit.

14. The microprocessor of claim 9, wherein each of the plurality of processing cores comprises a counter configured to increment by the number of executed instructions each core clock cycle, wherein the instruction execution indicator is an output bit of the count value of the counter.

15. The microprocessor of claim 14, wherein the output bit of the count value of the counter is bit M, wherein $M=\log_2 N$, wherein N is the product of the largest possible number of executed instructions per core clock cycle and the ratio of the core clock rate to the external bus clock rate.

16. The microprocessor of claim 9, wherein the heartbeat generator comprises a counter associated with each of the plurality of processing cores, wherein each counter is configured to increment by the number of executed instructions each core clock cycle indicated by the core instruction execution indicator, wherein the heartbeat indicator is an output bit of the count value of the counter.

17. The microprocessor of claim 16, wherein the output bit of the count value of the counter is bit M, wherein $M=\log_2 N$, wherein N is the product of the largest possible number of executed instructions per core clock cycle and the ratio of the core clock rate to the external bus clock rate.

18. The microprocessor of claim 17, wherein each of the instruction execution indicators comprises a single bit, wherein each of the heartbeat indicators comprises a single bit.

19. The microprocessor of claim 9, wherein the external bus comprises a sideband bus coupled to the microprocessor that is distinct from the main processor bus coupled to the microprocessor.

20. The microprocessor of claim 19, wherein at least a portion of the sideband bus comprises a JTAG bus.

21. The microprocessor of claim 19, wherein the sideband bus comprises a service processor bus coupled to a service processor within the microprocessor.

22. A microprocessor, comprising:
a plurality of processing cores, each configured to generate an indication of the number of instructions executed by the core during each clock cycle of the core;
a memory array, configured to store the indications generated by the plurality of processing cores for a sequence of core clock cycles; and
a bus interface unit, configured to couple to a bus external to the microprocessor, wherein the bus interface unit is configured to write the indications stored in the memory array to a memory external to the microprocessor.

23. The microprocessor of claim 22, wherein the bus interface unit is configured to write the indications to the external memory at a lowest priority relative to other requests to perform transactions on the external bus.

24. The microprocessor of claim 22, further comprising:
a heartbeat generator, coupled to the memory array and coupled to the bus interface unit and coupled to receive the instruction execution indicator from each of the plurality of processing cores, wherein the heartbeat generator is configured to write to the memory array the indications generated by the plurality of processing cores for the sequence of core clock cycles, wherein the heartbeat generator is further configured to read the indications from the memory array and cause the bus interface unit to write the indications to the external memory.

25. The microprocessor of claim 24, wherein the heartbeat generator is configured to wait to read the indications from the memory array and cause the bus interface unit to write the indications to the external memory until the sequence of core clock cycles has completed.

26. The microprocessor of claim 24, wherein the heartbeat generator is configured to periodically read the indications from the memory array and cause the bus interface unit to write the indications to the external memory.

* * * * *